Patented Feb. 8, 1944

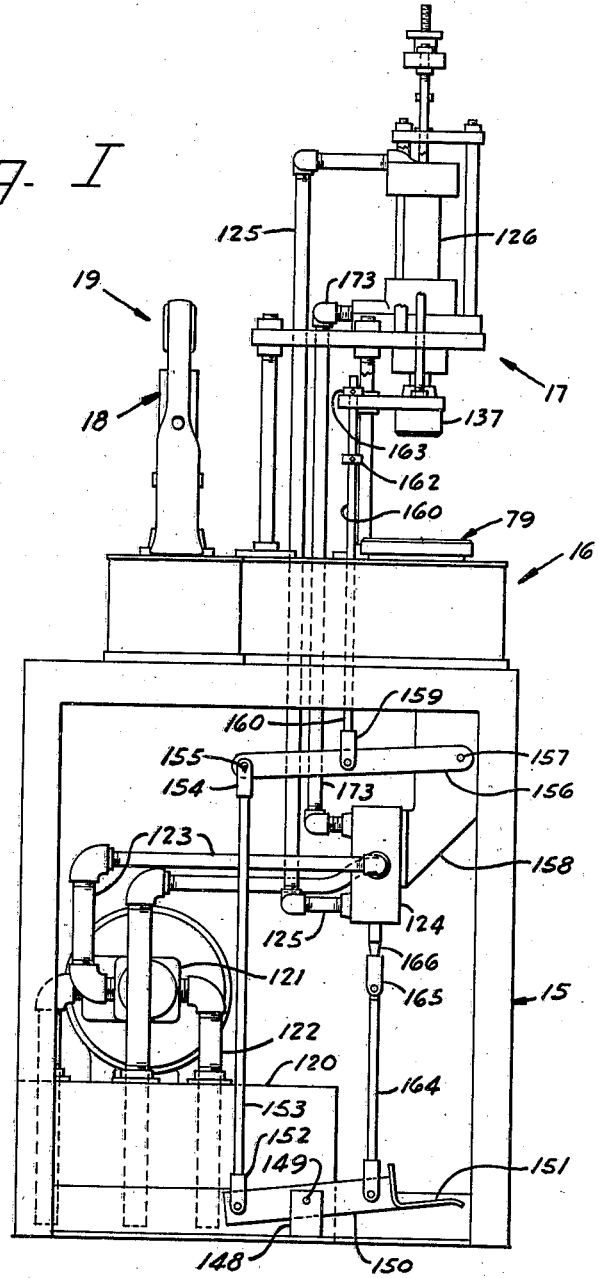

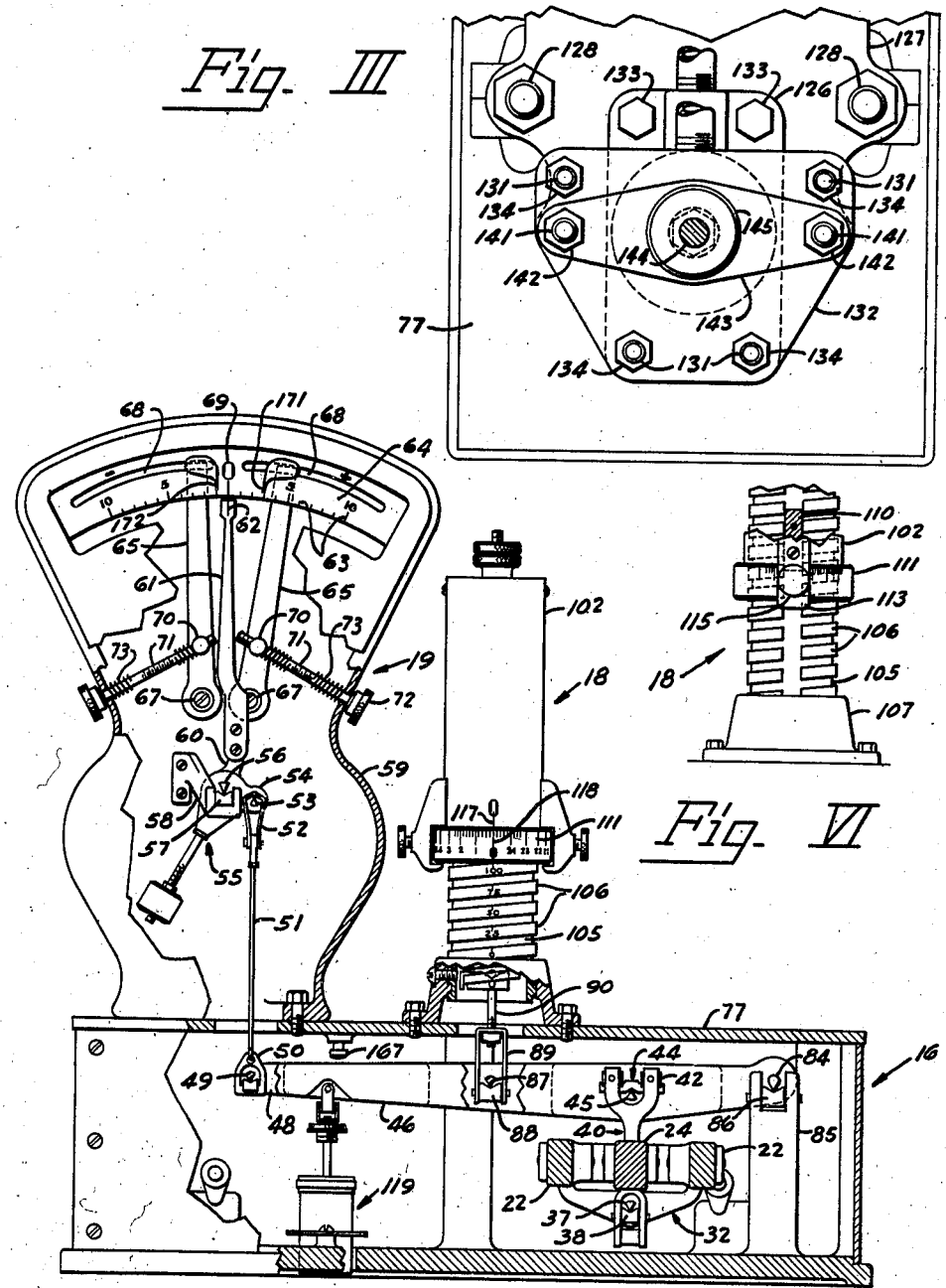

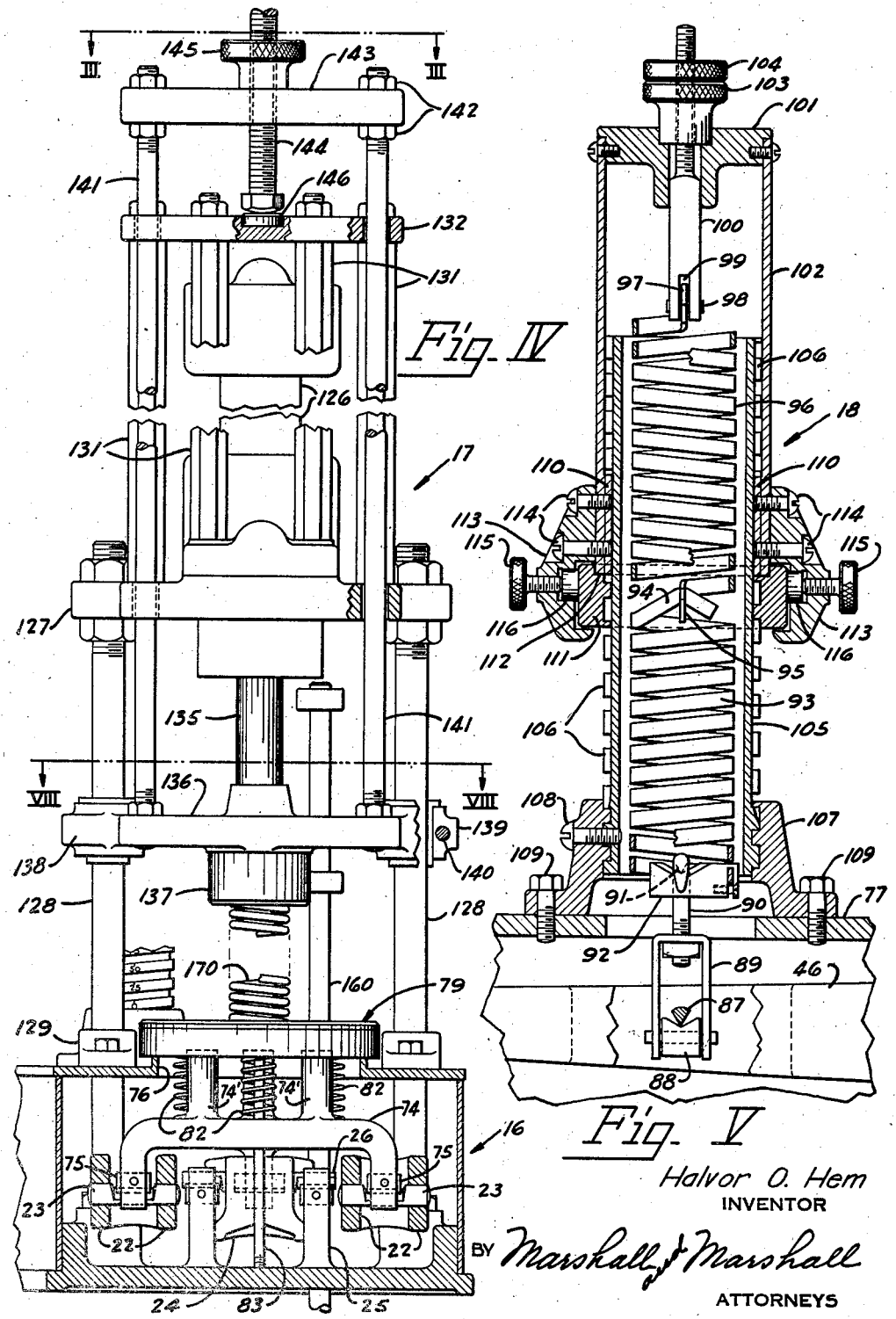

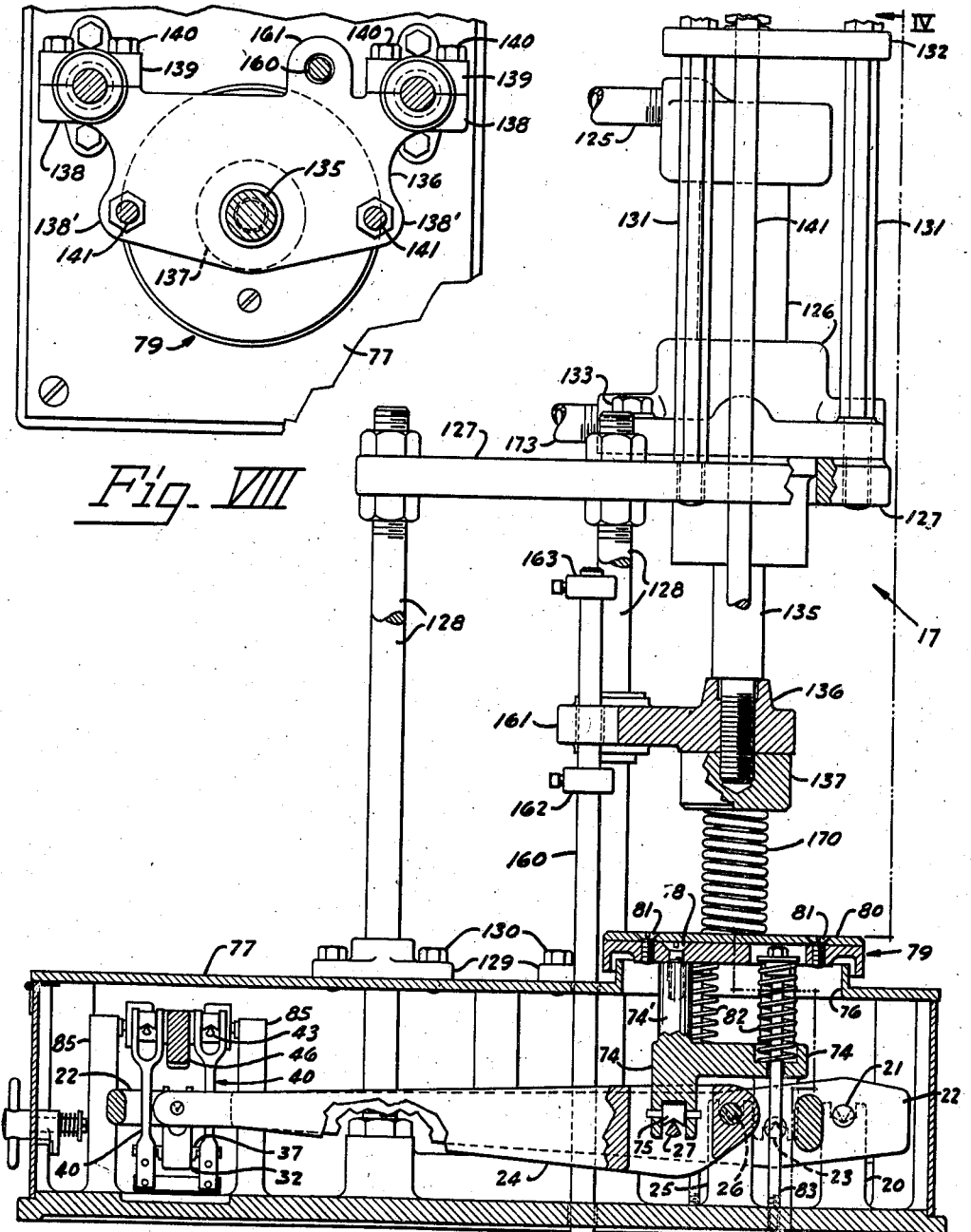

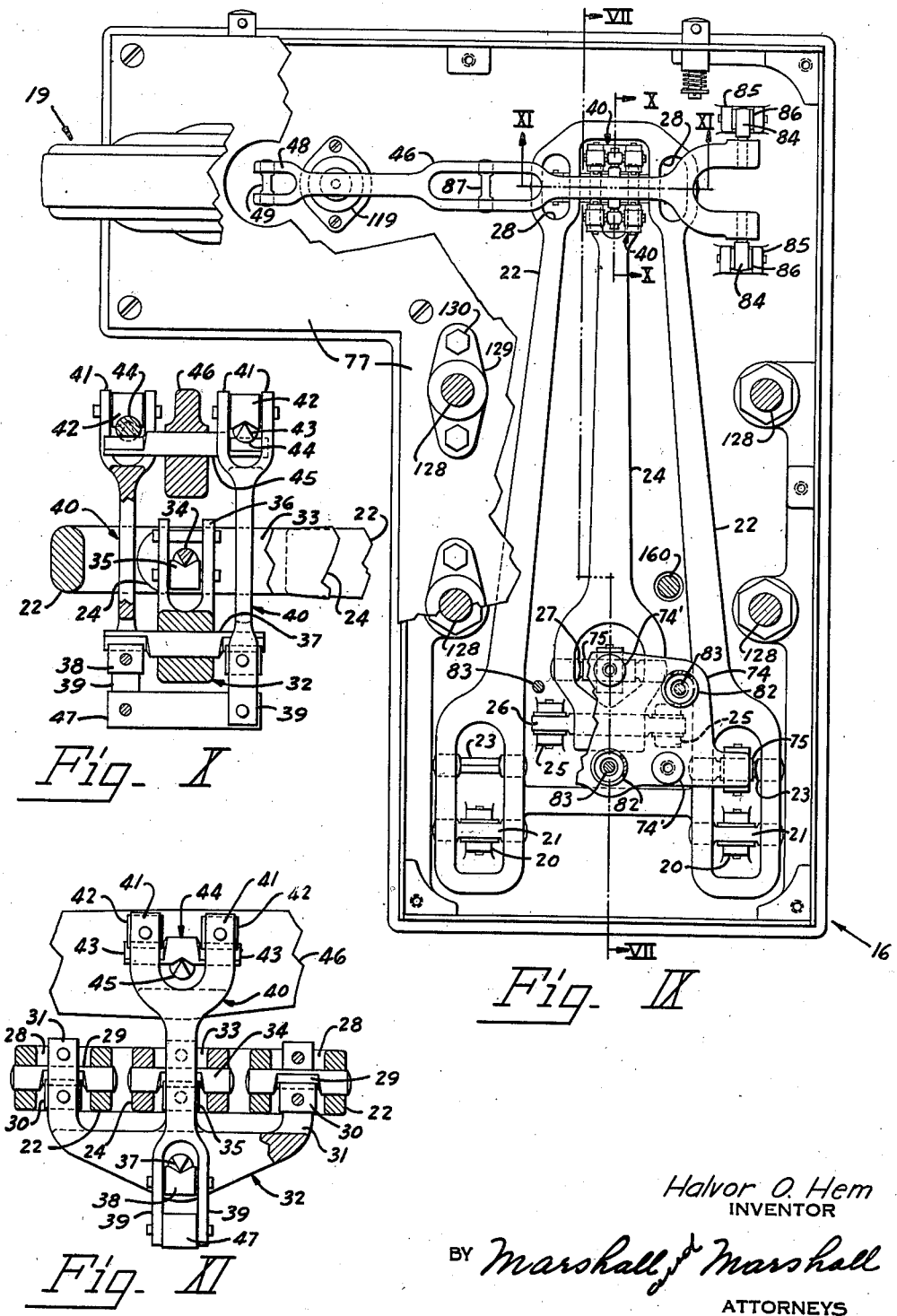

2,341,216

UNITED STATES PATENT OFFICE 2,341,216

WEIGHING SCALE

Halvor O. Hem, Toledo, Ohio, assignor to Toledo Scale Company, Toledo, Ohio, a corporation of New Jersey Application July 9, 1940, Serial No. 344,555

9 Claims. (Cl. 265—27)

This invention relates to force measuring devices, and more particularly to force measuring devices in the form of weighing scales especially adapted to determine the compressive strength of helical springs.

The smoothness of operation of an internal combustion engine depends in a large measure on the condition of balance of its movable members. Accordingly crank shafts, connecting rods, pistons and other rotating and/or reciprocating parts are carefully conditioned and selected. In addition to the balancing of the rotating and reciprocating parts, it was found that valve springs also effect the operation of the machine. This has led to the sorting of valve springs so that all springs in one motor have the same compressive strength. Self-indicating weighing scales of ordinary type, equipped with means for supporting and compressing the springs, are employed for this purpose. Although such scales are well adapted to determine and indicate the weight of articles within prescribed tolerances they are not well adapted to indicate very small variations in the compressive strength of springs. This requires the aid of an indicator which travels through a substantially large angle for a very small force increment.

The principal object of the present invention is therefore the provision of an improved spring testing device.

A further object is the provision of improved means in a device of the class described whereby a relatively small variation of force results in a relatively large movement of the indicator.

Another object is the provision of improved force offsetting means.

Another object is the provision of improved means for changing the force counterbalancing capacty of the device; and Still another object is the provision of improved actuating means.

These, and other objects and advantages will be apparent from the following description in which reference is had to the accompanying drawings, illustrating preferred embodiments of the invention and in which similar reference numerals refer to similar parts throughout the several views.

In the drawings:

Fig. I is a side elevational view of the device.

Fig. II is an enlarged front elevational view of the force counterbalancing and force indicating means, portions of casing members being broken away for clarity.

Fig. III is an enlarged fragmentary plan view as seen from the line III—III of Fig. IV.

Fig. IV is a front elevational view of the spring compressing means partly sectioned along the line IV—IV of Fig. VII.

Fig. V is an elevational view in section of the force counterbalancing means.

Fig. VI is a fragmentary side elevation showing a detail of the capacity varying means.

Fig. VII is an enlarged side elevational view sectioned substantially along the line VII—VII of Fig. IX.

Fig. VIII is a sectional plan view substantially along the line VIII—VIII of Fig. IV.

Fig. IX is a plan view of the lever system, housing members being broken away and others being sectioned, Fig. X is an enlarged sectional view along the line X—X of Fig. IX; and, Fig. XI is an enlarged sectional view along the line XI—XI of Fig. IX.

Referring to the drawings in detail:

The device comprises a supporting frame 15 surmounted by a base 16 upon which are erected the spring compressing means 17, force counterbalancing means 18 and force indicating means 19.

The base comprises an L-shaped box-like structure (Figures II, VII and IX). Arising from the bottom of this base are a pair of integrally cast upwardly extending posts 20 provided with V-grooved bearings in their upper ends for supporting thereon fulcrum pivots 21 of a two-armed lever 22. The rearward ends of these arms are bifurcated and the aforementioned pivots 21 extend across the bifurcations. In spaced relation to these fulcrum pivots and also extending across the bifurcations is a pair of load pivots 23 whose edges are upwardly directed. For the purpose of pivotally supporting a second lever 24, another pair of upwardly extending integral posts 25 are provided which are positioned between the arms of the lever 22. These posts are also equipped with V bearings in their upper ends and support the edges machined on the ends of a pivot member 26 which extends transversely through the lever 24. This lever is provided with a single load pivot 27 which extends across a bifurcated portion and similarly to the load pivots 23 in the lever 22 is upwardly directed.

The free, or nose end of each of the arms of the lever 22 is also provided with openings 28 through which nose pivots 29 project. The pivots 29, which are downwardly directed, engage V grooves in bearings 30 mounted between spaced arms 31 on the ends of a yoke-like equalizer 32. The lever 24 has a forked nose portion opening 33 in which a downwardly directed pivot 34 is mounted. This pivot engages the V of a bearing 35 mounted between spaced arms 36 which extends parallelly to the arms 31 of the yoke 32 and which are positioned centrally on the yoke 32 between the arms 31. Extending transversely through the body of the equalizer yoke 32 and secured therein, directly below the bearing 35, is a pivot 37 having downwardly directed knife edges machined on the ends extending on each side of the yoke 32. This pivot extends at an angle of 90° to the apices of the V grooves of the bearings 30 and 35. These knife edges engage bearings 38 mounted between forked arms 39 on the lower ends of a pair of connecting links 40 whose upper ends are forked and bifurcated thus forming a plurality of arms 41, between spaced pairs of which are mounted V bearings 42 which engage knife edges 43 on the opposite ends of a pivotal member 44 which in its central portion is provided with a V groove engaging each projecting knife edge of a pivot 45 transversely extending through an extension lever 46. It will be seen that the V groove in the members 44 extends exactly at an angle of 90° to its pivot edges 43. The two links 40, one of which being positioned on each side of the lever 46, to prevent their displacement, are connected at their lower ends through a tie bar 47. The yoke 32, the connecting links 40 in cooperation with the arrangement of the pivots and bearings in the several members form a universally pivotal connection which permits perfect freedom of movement of the levers 22 and 24 and the lever 46 which extends at right angles to the aforementioned levers.

For the purpose of operatively connecting the extension lever to force counterbalancing and force indicating means the extension lever 46 is provided with a forked nose 48 in which a power pivot 49 is fixed. This pivot engages a suitable bearing in a stirrup 50 suspended from the lower end of a connecting rod 51 whose upper end, by means of a stirrup 52, pivotally engages a pivot 53 in an angularly extending arm 54 of a force counterbalancing pendulum 55. This pendulum, by means of a fulcrum pivot 56 extending transversely through its body, is mounted upon bearings 57 seated in a suitably formed bracket 58 which is secured to the rear wall of a casing 59 of the load indicating means 19.

To an angularly extending arm 60 of the pendulum 55 is secured an indicator 61 whose upper end, provided with an index line 62, cooperates with a series 63 of indicia which are printed or otherwise marked on a chart 64 fixedly mounted in the upper end of the casing 59. Since it would be too expensive, if not impossible, to reject all springs whose compression when tested varied slightly from the standard the present device contemplates the establishment of slight variations below and above the standard compression. To enable the operator of the device to readily observe whether the spring being tested is within this tolerance, manually set index arms 65 are rotatably mounted upon suitable screws 67 passing through their hubs and threaded into the rear wall of the casing 59. The upper ends of these arms are properly shaped and bent forwardly through slots 68 in the chart 64 so that tips thereof, which may be contrastingly colored, serve as markers. To enable the operator to quickly set these index arms into desired relation to a zero indicium 69, which is a part of the series 63 of indicia on the chart 64, the arms 65 are provided with studs 70 which are secured thereto so that they may swivel about their longitudinal axis. These studs are provided with threaded openings extending therethrough at right angles to their longitudinal axes for the reception of the inner ends of screws 71. These screws extend through drilled holes in the walls of the casing 59 and are provided with knurled heads 72 by means of which the arms 65 may be swiveled about their fulcrums. To prevent lost motion and shifting of their position, owing to vibration or similar causes, a helical compression spring 73 is circumjacently mounted upon each of the screws and presses against the inner face of the wall of the housing and the stud 70.

The load pivots 23 and 27, in the levers 22 and 24 respectively, serve to support a platter supporting frame 74. This frame has three downwardly extending slotted bosses in which V groove bearings 75 are seated and these bearings pivotally engage the aforementioned pivots. Posts 74' integral with the frame project upwardly through a circular opening 76 of a cover 77 of the box-like base 16 and to these projecting posts is secured, by means of screws 78, a platter 79. Since this platter is subject to considerable wear in the operation of the device it is covered by a plate 80 of hardened steel, the plate 80 being secured to the platter 79 by means of countersunk screws 81.

Since devices of this kind must be as nearly "foolproof" as possible, during rapid operation, the platter supporting frame is held against accidental disengagement from its supporting pivots by means of three compression springs 82 whose lower ends are seated in counterbores in the frame 74 and whose upper ends engage adjustable heads threaded on rods 83 studded into the bottom of the base 16. Since the pressure exerted by these springs can be accurately adjusted their effect con be included when calibrating the counterbalancing means of the device.

The rear end of the lever 46, for the purpose of stability, is bifurcated and fulcrum pivots 84 are fixed in the spaced arms so that they extend laterally from the lever. Bosses 85 integrally cast on the bottom of the base 16 and extending upwardly therefrom are provided with V groove bearings 86 in their upper ends. These bearings engage the fulcrum pivots 84 and serve to rockingly support the lever 46. Intermediate the pivot 45 and the nose pivot 49 the lever 46 is bifurcated and the opening thus formed is spanned by a power transmission pivot 87 engaging a bearing 88 of a stirrup 89 (Figures V and II). The upper end of this stirrup 89 is provided with a hook-like extension 90 having a knife edge 91 which engages a V notch whose converging walls have knife-like edges of a small block 92 which is clamped to the lowermost convolution of a helical spring 93. The upper turn of this spring is formed into an obtuse hook 94 and this hook engages a similar hook 95 on the bottom of a similar spring 96. A second hook 97 is formed on the upper end of the spring 96 and this engages a pin 98 extending across a slot 99 in the lower end of an adjustable suspension member 100. The suspension member 100 has a rectangular cross section and is slidingly seated in a rectangular hole in a cap 101 which forms a closure for the upper end of a tubular spring housing member 102. That portion of the member 100 which extends beyond the cap 101 is turned and threaded. By means of a thumb nut 103 and lock nut 104 the vertical position of the member, and thus of the springs 96 and 93 suspended therefrom, may be carefully adjusted and locked in position. The tubular spring housing member 102 is telescopingly mounted on a second tubular housing member 105 in whose outer surface a coarse screw thread 106 is accurately cut. The bottom of this tubular member 105 is threaded and fastened into a base collar 107 and it is locked therein by means of a screw 108. This base collar is fastened to the base cover 77 in proper position by means of bolts 109.

In the interior of the tubular member 102, and extending longitudinally therein, are two splines 110. These splines are brazed or otherwise rigidly fastened and are adapted to slide in a groove formed by cutting away portions of the thread 106 on the tubular member 105. These grooves and splines cooperate to prevent the member 102 from turning when a collar 111, which is threaded on the threads 106, is screwed up or down to raise or lower the tubular housing 102, the lower edge of the tubular member 102 being seated in a shouldered recess 112 in the collar 111. The member 102 is retained in its seat in the collar 111 by two jaw-like brackets 113 which are secured to the member 102 by means of screws 114, the collar being free to revolve in a groove milled in these brackets. Screws 115, which are threaded through the jaw-like brackets 113, are adapted to press a plug 116 of relatively soft material such as fiber seated in a counterbore in the bracket 113 coaxial with the screw 115 against the periphery of the collar 111 after adjustment to lock it securely in position. It will be seen that by loosening the screws 115 and turning the collar 111 the tubular housing member 102 from which the springs 96 and 93 are suspended may be raised or lowered to increase or decrease the extension of these springs thus increasing or decreasing the counterbalancing capacity of the springs.

In the device illustrated the lead of the thread 106 and the tensile strength of the springs are so calculated and designed that extending the force counterbalancing springs 96 and 93 a distance equal to the lead of the thread 106 increases the counterbalancing effect of the springs 25 lbs. The collar 111 bears a series of graduations 118 to micrometrically indicate the subdivisions of one increment there being a zero or index indicium 117 engraved on the exterior of the member 102 to cooperate with the series 118.

The counterbalancing effect of the springs is designed to be less than the number of pounds indicated by the position of the collar 111 and the indicia 118 by the amount counterbalanced by the pendulum 55 when the index line 62 is in registration with the zero indicium 69 located near the center of the chart 64. Thus the counterbalancing effect for which the combination is condition is indicated by the setting of the collar 111 and small departures in excess or deficiency are indicated by the movement of the indicator 61 over the chart 64.

To damp the vibrations of the device a dashpot 119 mounted in the base is provided, the plunger of this dashpot being pivotally connected to the lever 46.

To apply pressure on the springs being tested the present invention contemplates the provision of hydraulically actuated mechanism. This mechanism comprises an oil reservoir 120, a motor driven pump 121 and conduits 122, 123 for feeding the fluid to a control valve 124 and under certain conditions the fluid then passes through a conduit 125 to the upper end of a hydraulic pressure cylinder 126. This pressure cylinder is erected on a shelf-like plate 127 supported by means of four stanchions 128 (Figures VII and IX). These stanchions are studded into suitable bosses on the bottom of the base 16 and extend upwardly through the cover 77. To obtain greater rigidity, they pass snugly through collars 129 which are, by means of bolts 130, fastened to the cover 77. Erected upon the plate 127 is a frame comprising four posts 131 and a plate 132 (Figures VII and III). Two of these posts are studded directly into the plate 127 while the forward two first pass through holes in the base member of the pressure cylinder 126 thus serving to bolt this cylinder to the plate 127. The rear of the base of this cylinder is retained by bolts 133. The plate 132 rests upon tenoned shoulders on the posts 131 and securely locked thereto by means of nuts 134. The piston (not shown) of the pressure cylinder 126 has a downwardly projecting extension 135, a tenoned end thereof being threaded through a movable bracket 136 and into a pressure block 137 which thus serves to securely lock the bracket 136 against the shoulder formed by tenoning the end. The bracket 136 has two rearwardly extending ears 138 (Fig. VIII), each of these ears has a flat face and a semicircular groove is machined vertically therein. A cap 139 having a complementary groove is bolted to the face by means of bolts 140. Seated in the circular hole formed by the semicircular grooves is a spool-like brass bushing which is slidingly mounted on two of the stanchions 128. This bracket thus forms a guide for the lower end of the extension 135 of the piston.

The block 137, which during the operation engages the upper end of the spring, is made of high carbon steel and hardened to minimize the wear.

Other ears 138' of this bracket 136 have drilled and tapped holes into which the lower ends of guide posts 141 are threaded. These guide posts extend upwardly through suitable openings in the plates 127 and 132 and the upper ends thereof are bolted, by means of nuts 142, to a tie plate 143. For a purpose, which will hereinafter become clear, a steel bolt 144 having a rounded and hardened head is threaded through this tie plate and a thumb nut 145 threaded on this bolt on the upper side of the tie plate serves to lock this bolt in desired position. The plate 132 is provided with a hardened steel plug 146 seated in a counterbore in its upper surface in a position to engage the hardened end of the bolt 144.

For controlling the operation of the hydraulic pressure means, a bracket 148, fastened to one of the lowermost angles forming the frame 15, forms a fulcrum as at 149 for a lever 150 which is provided at the forward end with a foot treadle 151. This lever is so stationed within the frame that the operator may comfortably engage it with his foot. The rear free end of the lever 150 pivotally engages a clevis 152 secured to the lower end of a connecting rod 153 whose upper end, which is also provided with a clevis 154, pivotally engages as at 155 the free end of a lever 156 which is fulcrumed as at 157 on a bracket 158 which forms a rigid member of the frame 15. Intermediate the pivotal joints 157 and 155 a clevis 159 is pivotally connected to this lever and this clevis has rigidly secured to its upper end an actuating rod 160, projecting upwardly through aligned openings in the bottom of the base 16 and in the base cover 77. These openings serve to guide the rod 160 during its reciprocating movement. The rod 160 also projects through an opening in an ear 161 of the bracket 136. Collars 162 and 163 are adjustably mounted on the rod 160 below and above the ear 161 of the bracket 136 and are adapted to be engaged by this ear.

The lever 150 is pivotally engaged by the clevis-like end of a valve actuating rod 164, the upper end of which, through a hinged coupling 165, engages a protruding portion of a piston 166 of the control valve 124. This valve is fixedly positioned to the bracket 158.

The operation of the device is as follows. For example, it is assumed that valve springs are to be selected to have a compressive strength of exactly 100 pounds when compressed a certain exact proportion of their free length. The thumb screws 115, which lock the telescoping half of the load counterbalancing spring housing, are loosened and the graduated collar 111 is turned on the threads 106 cut in the lower half 105 of this housing until its index line 118 is in registration with that graduation marked on the face of the threads 106 which is indicative of this resistance. The "pull" exerted by the springs 96 and 93 acting through the bearing 88 against the pivot 87 pulls the lever 46 against an adjustable stop 167 positioned on the inner surface of the base cover 77 and directly above the lever 46 adjacent its free end.

After conditioning the counterbalancing springs 96 and 93, in the manner hereinbefore described, to offset the amount that it is desired to load the springs to obtain the desired compression, the steel bolt 144 threaded through the tie plate 143 is then adjusted so that when its rounded head engages the hardened steel plug 146 in the plate 132 the distance between the lower face of the pressure block 137 and the upper face of the platter 79 is such that a spring, such as 170 (Fig. VII), will be compressed the required proportion of its free length. This is readily accomplished by making a gauge block and grinding it to the required length of the compressed spring placing it on the platter 79 and moving the pressure block 137 downwardly until through the levers 22, 24 and 46 the pendulum 55 is rocked into a position in which the index line 62 on the indicator 61 is in registration with the zero indicium 69 of the series 63 on the chart 64.

As hereinbefore mentioned, it is almost impossible to afterwards select springs which all move the index line 62 exactly into registration with the zero indicium 69 when compressed to the desired height without some little variation. The permissible variation is therefore established and the index arms 65 are rocked about their fulcrums on the screws 67 by turning the thumb nuts 72 until index points 171 and 172, projecting over the face of the chart 64, are positioned so that the operator can readily determine whether the spring is within this tolerance. The collar 162 on the actuating rod 160 is so positioned on this rod that when the bolt 144 engages the hardened plug 146 the actuating rod 160 has been depressed so that through the lever 156, the connecting rod 153, the lever 150 and the connecting rod 164 has moved the piston 166 of the control valve upwardly to shut off the flow of the fluid through the conduit 125 and has diverted this fluid to flow through a conduit 173 into the bottom of the hydraulic cylinder 126 thus causing the fluid to force the piston in this hydraulic cylinder upwardly until the collar 163, which is now positioned to be engaged by the ear 161 of the bracket 136, raises the actuating rod and through the aforementioned levers 156 and 150 and connecting rods 153 and 164 positions the piston 166 of the control valve 124 to stop all flow of the fluid through the hydraulic cylinder 126 when the piston in this cylinder is in its upper position.

The operator now places one of the springs 170 on the platter 79 directly below the pressure block 137, by stepping on the treadle 151 (Fig. I) and pressing downwardly the piston 166 in the control valve 124 through the medium of the connecting rod 164 is positioned so that circulating pressure fluid through the conduits 123 and 125 is forced in the upper portion of the hydraulic cylinder 126 in the manner hereinbefore described and presses the pressure block 137 downwardly against the spring. This spring is now compressed, it absorbs this pressure until this pressure is equal to the resistance of the counterbalancing springs 96 and 93 and the lever 46, which until this time has been in engagement with the adjustable stop 167, moves downwardly until the head of the screw 144 comes into engagement with the hardened plug 146 and the ear 161 of the bracket 136 has engaged the collar 162 and has moved through the piston 166 of the control valve 124 to reverse the flow of the fluid, there being a slight lag in the movement before this reversal takes place and at this time the operator determines the position of the index line 62 in relation to the series of graduations 63 on the chart 64. If this index line is positioned in the space defined by the index points 171 and 172 the spring is according to the desired standard and acceptable. If the index line 62 on the indicator 61 is not within this space then the spring is not according to the standard and must be discarded.

The embodiments of the invention herein shown and described are to be regarded as illustrative only, and it is to be understood that the invention is susceptible to variation, modification and change within the spirit and scope of the subjoined claims.

Having described the invention, I claim:

1. In a force measuring device, in combination, a lever system, a platter pivotally mounted upon said lever system, a load counterbalancing spring and auxiliary automatic load counterbalancing means each operatively connected to said lever system to counterbalance a force applied on said platter, said load counterbalancing spring being adapted to be initially conditioned to counterbalance the major part of a force of definite magnitude, means for fixing said spring in such condition, means cooperating with said spring for indicating the magnitude of force to be counterbalanced by said spring and auxiliary automatic load counterbalancing means acting together and an indicator connected to said auxiliary automatic load counterbalancing means for indicating minor increments of force in excess or in deficiency of the magnitude for the major part of which said counterbalancing spring is conditioned.

2. In a force measuring device, in combination, a lever system, a platter pivotally mounted upon said lever system, counterbalancing spring means operatively connected to said lever system to counterbalance a force applied on said platter, said counterbalancing spring means comprising a lower housing member and an upper housing member, means adjustably secured to the upper housing member for supporting the upper end of a load counterbalancing spring whose lower end pivotally engages said lever system, means on the lower housing member for micrometrically raising and lowering said upper housing member for extending said spring and conditioning said spring to counterbalance a force of definite magnitude, means cooperating with said housing members for indicating such definite magnitude and means for locking said housing members against relative movement.

3. In a force measuring device, in combination, a lever system, a platter pivotally mounted upon said lever system, counterbalancing spring means operatively connected to said lever system to counterbalance a force applied on said platter, said counterbalancing spring means comprising a lower housing member and an upper housing member, means adjustably secured to the upper housing member for supporting the upper end of a load counterbalancing spring whose lower end pivotally engages said lever system, means on the lower housing member for micrometrically raising and lowering said upper housing member for extending said spring and conditioning said spring to counterbalance a force of definite magnitude, and means for locking said housing members against relative movement, said means for micrometrically raising and lowering said upper housing member including a rotatable member operatively connected to the lower housing member, said rotatable member bearing a series of graduation marks and a series of graduation marks on said lower housing member.

4. In a force measuring device, in combination, a lever system, a platter pivotally mounted upon said lever system, counterbalancing spring means operatively connected to said lever system to counterbalance a force applied on said platter, said counterbalancing spring means comprising an upper tubular housing member and a lower tubular housing member, a thread cut in the outer surface of said lower tubular housing member, a collar adjustably mounted on said thread, said upper tubular housing member being in telescopic relation to said lower tubular housing member and resting upon said collar, a counterbalancing spring suspended from the upper end of said upper tubular housing member, the lower end of said spring pivotally engaging said lever system, said collar being adapted to raise and lower the upper tubular housing member relative to said lower tubular housing member whereby said spring is extended and conditioned to counterbalance a definite amount of force applied on said platter and means for locking said housing members against relative movement.

5. In a force measuring device, in combination, a lever system, a platter pivotally mounted upon said lever system, counterbalancing spring means operatively connected to said lever system to counterbalance a force applied on said platter, said counterbalancing spring means comprising an upper tubular housing member and a lower tubular housing member, a thread cut in the outer surface of said lower tubular housing member, a collar adjustably mounted on said thread, said upper tubular housing member being in telescopic relation to said lower tubular housing member and resting upon said collar, a counterbalancing spring adjustably suspended from the upper end of said upper tubular housing member, the lower end of said spring pivotally engaging said lever system, said collar being adapted to raise and lower the upper tubular housing member relative to said lower tubular housing member whereby said spring is extended and conditioned to counterbalance a definite amount of force applied on said platter and a pendulum load counterbalancing means operatively connected to said lever system for complementing said spring load counterbalancing means.

6. In a force measuring device, in combination, a lever mechanism, a platter pivotally mounted upon said lever mechanism, counterbalancing spring means operatively connected to said lever mechanism to counterbalance a force applied on said platter, said counterbalancing spring means comprising an upper tubular housing member and a lower tubular housing member, a thread cut in the outer surface of said lower tubular housing member, a collar adjustably mounted on said thread, said upper tubular housing member being in telescopic relation to said lower tubular housing member and resting upon said collar, a series of calibrating marks on said lower tubular housing member, a series of calibrating marks on said collar, a counterbalancing spring suspended in the interior of said tubular housing members from the upper end of said upper tubular housing member, the lower end of said spring pivotally engaging said lever mechanism, said collar being adapted to raise and lower the upper tubular housing member relative to said lower tubular housing member, and said calibrating marks on said collar and on said lower tubular housing member being adapted to cooperate to micrometrically position the upper tubular housing member whereby said spring is extended and conditioned to counterbalance a definite amount of the force applied on said platter.

7. In a force measuring device as defined in claim 6, means for preventing rotative movement of said upper tubular housing member relative to said lower tubular housing member, said means comprising a groove in one of said members and a spline on the other one of said housing members engaging said groove.

8. In a force measuring device, in combination, a lever system, a platter pivotally mounted upon said lever system, counterbalancing spring means operatively connected to said lever system to counterbalance a force applied on said platter, said counterbalancing spring means comprising an upper tubular housing member and a lower tubular housing member, a thread cut in the outer surface of said lower tubular housing member, a collar adjustably mounted on said thread, said upper tubular housing member being in telescopic relation to said lower tubular housing member and resting upon said collar, a counterbalancing spring suspended from the upper end of said upper tubular housing member, the lower end of said spring pivotally engaging said lever system, said collar being adapted to raise and lower the upper tubular housing member relative to said lower tubular housing member whereby said spring is extended and conditioned to counterbalance a predetermined portion of the force applied on said platter, a pendulum load counterbalancing means operatively connected to said lever system for complementing said spring load counterbalancing means, a graduated chart and an index secured to said pendulum for indicating small increments of force in excess or in deficiency of said predetermined portion of the force counterbalanced by said spring counterbalancing means.

9. In a force measuring device as defined in claim 8, means for housing said pendulum, said indicator and said graduated chart comprising a casing, means cooperating with said graduated chart for defining a tolerance range thereon, said means comprising a pair of index points adapted to be positioned along the face of said chart and means extending to the exterior of said casing for positioning said index points.

HALVOR O. HEM.